(12) United States Patent  (10) Patent No.: US 8,956,734 B2
Song et al.  (45) Date of Patent: Feb. 17, 2015

(54) BLACK RESIN STEEL PLATE HAVING IMPROVED DRAWING ABILITY AND GOOD MANUFACTURING THE SAME

(75) Inventors: Yon Kyun Song, Gwangyang-si (KR); Chang Hoon Choi, Gwangyang-si (KR); Yeon Ho Kim, Gwangyang-si (KR); Jae Dong Cho, Gwangyung-si (KR)

(73) Assignee: Posco, Pohang-si (KR)

( * ) Notice: Subject to any disclaimer, the term of this patent is extended or adjusted under 35 U.S.C. 154(b) by 0 days.

(21) Appl. No.: 13/824,535

(22) PCT Filed: Nov. 4, 2011

(86) PCT No.: PCT/KR2011/008375
§ 371 (c)(1),
(2), (4) Date: Jun. 4, 2013

(87) PCT Pub. No.: WO2012/081829
PCT Pub. Date: Jun. 21, 2012

(65) Prior Publication Data
US 2013/0244053 A1  Sep. 19, 2013

(30) Foreign Application Priority Data
Dec. 13, 2010  (KR) .......................... 10-2010-0126713

(51) Int. Cl.
*B32B 15/04* (2006.01)
*B32B 15/08* (2006.01)
(Continued)

(52) U.S. Cl.
CPC . *C23C 22/53* (2013.01); *C09D 5/08* (2013.01); *C09D 7/125* (2013.01); *C23C 2/26* (2013.01);
(Continued)

(58) Field of Classification Search
CPC ...... B32B 15/04; B32B 15/043; B32B 15/08; B32B 15/18; C23C 2/26; C23C 28/345; C23C 28/83; C23C 28/00; C23C 28/3225; C23C 22/53; C23C 22/50; C23C 28/30; C23C 28/32; C23C 28/34; C23C 28/3445
USPC ......... 428/623, 626, 624, 634, 659, 658, 679, 428/680, 687, 215, 216, 220, 336, 632, 633, 428/684
See application file for complete search history.

(56) References Cited

U.S. PATENT DOCUMENTS

2010/0021726 A1 * 1/2010 Jo et al. .......................... 428/336

FOREIGN PATENT DOCUMENTS

CN  101573403 A  11/2009
JP  06316772 A  11/1994
(Continued)

OTHER PUBLICATIONS

R. A. Al-Samarai, et al., "Effect of Load and Sliding Speed on Wear and Friction of Aluminum-Silicon Casting Alloy," in International J. of Scientific and Research Publications, vol. 2, Issue 3, Mar. 2012, pp. 1-4.*

(Continued)

*Primary Examiner* — Michael E La Villa
(74) *Attorney, Agent, or Firm* — The Webb Law Firm

(57) ABSTRACT

Provided is a black resin steel plate having superior drawing ability and glossiness and particularly to a black resin steel plate in which the coefficient of friction of a black resin film is adjusted so as to block the transfer of a resin layer due to a reduction in thickness of the resin layer, thereby improving blackness and drawing ability, and to a method of manufacturing the same.

12 Claims, 1 Drawing Sheet

(51) Int. Cl.
*B32B 15/18* (2006.01)
*B05D 5/00* (2006.01)
*B05D 5/08* (2006.01)
*C23C 22/53* (2006.01)
*C23C 30/00* (2006.01)
*C09D 5/08* (2006.01)
*C09D 7/12* (2006.01)
*C23C 2/26* (2006.01)
*C23C 22/83* (2006.01)
*C23C 28/00* (2006.01)

(52) U.S. Cl.
CPC ................. *C23C 22/83* (2013.01); *C23C 28/00* (2013.01); *C23C 28/3225* (2013.01); *C23C 28/345* (2013.01)
USPC ........... 428/626; 428/659; 428/687; 428/336; 428/632; 428/633; 428/684; 427/409; 427/419.2; 427/435; 148/273; 148/286

(56) References Cited

FOREIGN PATENT DOCUMENTS

| | | | |
|---|---|---|---|
| JP | 0913178 A | | 1/1997 |
| JP | 10128906 A | | 5/1998 |
| JP | 2000290783 | | 10/2000 |
| JP | 2002-047579 | * | 2/2002 |
| JP | 2002047579 | | 2/2002 |
| JP | 2006-028581 | * | 2/2006 |
| JP | 2006028581 | | 2/2006 |
| JP | 2010514886 | | 5/2010 |
| KR | 20020041602 A | | 6/2002 |

OTHER PUBLICATIONS

Machine Translation, Yatsui, JP 2006-028581, Feb. 2006.*
Machine Translation, Watase et al., JP 2002-047579, Feb. 2002.*

* cited by examiner

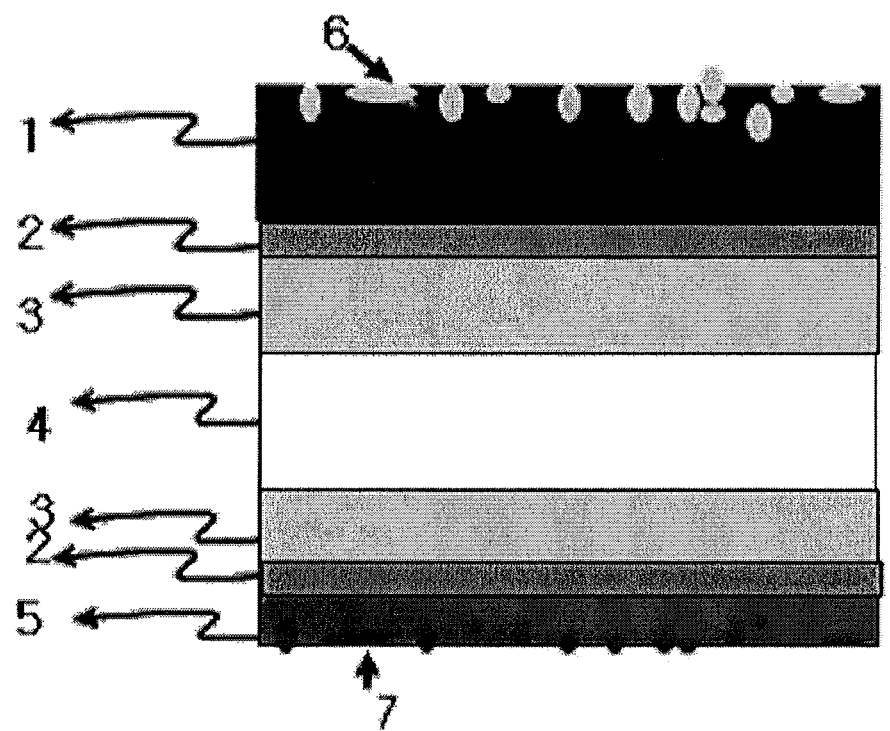

BLACK RESIN STEEL PLATE HAVING IMPROVED DRAWING ABILITY AND GOOD MANUFACTURING THE SAME

TECHNICAL FIELD

The present invention relates to a black resin steel plate in which a coefficient of friction of a black resin film is adjusted thus solving problems of reduced corrosion resistance upon forming a thin black resin film and of cracking upon drawing, and to a method of manufacturing the same.

BACKGROUND ART

Amidst the recent competition of manufacturers to reduce the thickness of the interior and exterior materials of electronic products for home appliances such as PDPs, LCDs, LED TVs, etc., injected plastic products which have been conventionally used for the interior and exterior materials are being rapidly replaced by thin iron steel plates. Particularly in the case of exterior materials, a resin coated steel plate such as a black resin steel plate the surface of which is beautiful and is colored is being applied so that it is able to be mounted directly onto products after pressing without additional painting.

Typically, a resin coated steel plate has a structure of top coat/primer/zinc plated steel plate/primer, and the top coat layer is composed mainly of a polyester resin and a melamine resin with a thickness 10~50 μm, and the primer layer is composed mainly of an acrylic urethane ester resin and has a thickness of 0.5~1.0 μm.

Such a resin coated steel plate may be applied to exterior materials directly after pressing without having requiring additional painting, and it is produced to have a blackness of about 75~98 because the color of the top coat layer prefers black (blackness=100−$L^*$, $L^*$=whiteness) in terms of surface appearance.

The color of the resin film is determined by the properties of a pigment composed mainly of carbon black and the film thickness properties. As the amount of the black pigment increases and the thickness of the film increases, black color is observed with the naked eye due to the absorption of light, that is, the blackness is increased. The case where the blackness (100−$L^*$) is 80 or more is regarded as "real black", the case where the blackness is 80~50 is regarded as "black gray", and the case where the blackness is 50 or less is regarded as "gray". The ability of the resin coated steel plate to absorb/radiate heat may increase depending on the blackness based on the composition properties of a paint resin for use in the pigment that exhibits the blackness. The heat transfer is possible by direct heat transfer through an object, heat convection, and radiant heat, and absorption/radiation by radiant heat may increase in proportion to the increase in blackness. In particular, in back-cover material fields for image displays, black (real black) is preferred because of "beautiful factors" and "heat emission from an image device".

In order to enhance the bondability between the top coat layer and zinc metal, the primer layer comprises an organic/inorganic composite film composed mainly of acrylic urethane ester. To increase productivity in a continuous process for producing the resin coated steel plate thus structured, it is favorable that the thickness of the top coat layer be decreased. However, as the thickness of the top coat layer (the resin layer) is decreased, the zinc plated layer may be transferred to the surface of black resin, undesirably reducing blackness and corrosion resistance.

Culminating in the present invention, intensive and thorough research was carried out by the present inventors aiming to solve the problems of blackness and drawing ability being reduced in proportion to a decrease in the thickness of the resin layer as encountered in the related art. The research led to the development of a black resin steel plate having improved blackness and drawing ability by decreasing the coefficient of friction of a black resin film.

Accordingly, an object of the present invention is to provide a black resin steel plate in which the transfer of a resin layer due to a reduction in thickness of the resin layer may be blocked and blackness and drawing ability may be improved, and also to provide a method of manufacturing the same.

SUMMARY OF THE INVENTION

In order to accomplish the above object, an aspect of the present invention provides a black resin steel plate, comprising a blackening layer formed on one side of a zinc plated steel plate; and a black resin film which is formed on the blackening layer and which contains a black pigment and satisfies Formula 1 below.

$$0.05 \leq X \leq 0.27 \qquad \text{[Formula 1]}$$

In Formula 1, X is a coefficient of friction calculated by a draw bead test of a black resin film sample having a size of 150 mm×50 mm under conditions including a load of 650 kgf and a rate of 20 mm/s.

Another aspect of the present invention provides a method of manufacturing a black resin steel plate, comprising forming a blackening layer on a steel plate; and forming a black resin film that satisfies Formula 1 below, on the blackening layer.

In a black resin steel plate according to the present invention, the coefficient of friction of a black resin film is decreased, thus blocking the transfer of a zinc plated layer due to a reduction in thickness of the black resin film, thereby remarkably improving blackness and increasing drawing ability and glossiness.

BRIEF DESCRIPTION OF THE DRAWING

The drawing is a schematic cross-sectional view showing a black resin steel plate according to an embodiment of the present invention[1: black resin film on the one side, 2: blackening layer, 3: zinc plated layer, 4: steel plate, 5: black resin film on the other side, 6: wax, 7:wax].

BEST MODE

The present invention pertains to a black resin steel plate, comprising a blackening layer formed on one side of a zinc plated steel plate; and a black resin film which is formed on the blackening layer and which contains a black pigment and satisfies Formula 1 below.

$$0.05 \leq X \leq 0.27 \qquad \text{[Formula 1]}$$

In Formula 1, X is a coefficient of friction calculated by a draw bead test of a black resin film sample having a size of 150 mm×50 mm under conditions including a load of 650 kgf and a rate of 20 mm/s.

The present invention is described in detail below. In the present invention, the term "blackness" is a numerical value that shows the degree of blackening of a coating film, obtained by measuring the value of whiteness. Whiteness is the degree of which a surface is white based on CIE (the International Commission on Illumination). CIE defines a standard index of color using wavelength of light. Color meter which is commercially developed is widely used to monitor the whiteness of the surface. In the case of L*=100, only white color is shown, and in the case of L*=0, only black color is shown. The blackness may be represented by 100−L*.

In the present invention, the zinc plated steel plate may be a zinc or zinc alloy plated steel plate, but is not limited thereto.

In the present invention, in order to block the transfer effect which is the problem of a conventional resin coated steel plate, the blackening layer is composed of a black film obtained by applying a blackening solution comprising 10~20 wt. % of $Ni^{2+}$, 11~18 wt. % of 1~3.5 wt. % of an organic acid and a remainder of water on a steel plate so that the metal of the steel plate reacts with the metal of the solution to deposit a nickel-zinc oxide (which is a metal oxide comprising Ni, Zn and O at a weight ratio of Ni:Zn:O=25~75:2~25:20~70) on the surface of the steel plate.

The thickness of the blackening layer may be 0.05~5 μm, and preferably 0.1~3.0 μm.

In the present invention, the black resin film is formed by applying a resin composition for a black resin steel plate, which is typically used in the art, and the resin composition includes a main resin containing one or more selected from the group consisting of a polyester resin, a melamine resin, and mixtures thereof.

Herein, particularly useful is a black resin film composed mainly of a polyester resin, and the polyester resin may be replaced by an epoxy resin, an acryl resin or an alkyd resin.

Also, the resin composition for forming the black resin film includes 5~25 parts by weight of a black pigment based on 100 parts by weight of the main resin, and the black pigment may include carbon black, carbon nanotubes, graphite or the like.

Furthermore, a solvent used for the resin composition functions to facilitate the dissolution of the main resin, and specific examples thereof may include aromatic hydrocarbon, aromatic naphtha, isobutylalcohol, and dipropyleneglycolmonoethylether, which may be used alone or in combination. The solvent may be used in an amount of 20~50 parts by weight of a black pigment based on 100 parts by weight of the main resin.

Also, the resin composition may include additives such as a pigment, a color separation stabilizer, a defoaming agent, a leveling agent, a slipping agent, an acid catalyst, etc., in addition to the main resin, the solvent, and the black pigment.

Particularly in the present invention, wax may be further added to the resin composition so that lubricating properties are imparted to the surface of the resin layer. Specific examples of the wax are not particularly limited but include natural wax, such as carnauba, candelilla, wool or the like, and synthetic wax such as polyethylene, polypropylene, modified polypropylene, paraffin, SASOLWAX®, etc., which may be used in the form of a liquid or solid.

The wax may be used in an amount of 0.1~10 parts by weight based on 100 parts by weight of the main resin. If an excess of wax is added, the film may be undesirably separated.

The thickness of the black resin film may be 0.5~25 μm (preferably 1~10 μm), which achieves the formation of a thin film while preventing the blackness from decreasing.

Also in the present invention, a blackening layer and a black resin film which are the same as those on one side of the zinc plated steel plate may be further formed on the other side thereof. Also, a blackening layer which is the same as that on one side and a black resin film which is different from that on one side may be further formed on the other side. The black resin film on the other side, different from that on the one side, is temporarily rust resistant, and any resin may be used therefor so long as it is typically used in the art, and may include an acrylic resin, preferably an acrylic urethane ester resin. Furthermore, wax may be added in an amount of 0.1~5 parts by weight based on 100 parts by weight of the acrylic resin, and may include a TEFLON®-based wax, a dispersed carnauba-based wax, a liquid polyethylene-based wax, etc. The black resin film on the other side, different from that on the one side, may be 0.1~1 μm thick.

The black resin film on the one side satisfies Formula 1 below, and the black resin film on the other side may satisfy Formula 2 below.

$$0.05 \leq X \leq 0.27 \quad \text{[Formula 1]}$$

In Formula 1, X is a coefficient of friction calculated by a draw bead test of a black resin film sample having a size of 150 mm×50 mm under conditions including a load of 650 kgf and a rate of 20 mm/s.

$$0.05 \leq X \leq 0.2 \quad \text{[Formula 2]}$$

In Formula 2, X is a coefficient of friction calculated by a draw bead test of a black resin film sample having a size of 150 mm×50 mm under conditions including a load of 650 kgf and a rate of 20 mm/s.

As mentioned above, the black resin steel plate according to the present invention can have improved blackness of 70 or more by adjusting the coefficient of friction even when the thickness of the black resin film is reduced, and also can exhibit superior drawing ability.

In addition, the present invention pertains to a method of manufacturing the black resin steel plate, comprising forming a blackening layer on a steel plate and forming a black resin film that satisfies Formula 1 below on the blackening layer:

$$0.05 \leq X \leq 0.27 \quad \text{[Formula 1]}$$

In Formula 1, X is a coefficient of friction calculated by a draw bead test of a black resin film sample having a size of 150 mm×50 mm under conditions including a load of 650 kgf and a rate of 20 mm/s.

In the present invention, the blackening layer is a black film satisfying Formula 1, formed by applying a blackening solution comprising 10~20 wt. % of $Ni^{2+}$, 11~18 wt. % of $Cl^-$, 1~3.5 wt. % of an organic acid and a remainder of water so that the metal of the steel plate reacts with the metal of the solution to form a metal oxide on the surface of the steel plate.

Herein, $Ni^{2+}$ is substitution deposited in the form of a metal oxide on the surface of the zinc plated steel plate, and plays an important role in showing black while forming spherical particles on the surface.

Furthermore, $Cl^-$ is used to increase reactivity, and the organic acid functions to enhance the solution stability and the force of adhesion of the film, and may include but is not limited to one or more selected from the group consisting of acetic acid, citric acid, tartaric acid, malic acid, oxalic acid, phthalic acid, and maleic acid.

The blackening solution may further include other additives, in addition to the above components, and any additive may be used without limitation so long as it is usable in the blackening solution in the art.

In the case where the blackening solution is applied on the zinc coated steel plate, nickel of the solution may be subjected to a substitution reaction with zinc, thus forming a black nickel-zinc-oxide film on the surface of the steel plate.

Furthermore, applying the blackening solution on the steel plate may be performed using immersion or coating, and coating is not particularly limited and may include a known coating process, for example, bar coating, dip coating, roll coating, curtain coating, spray coating, slit coating, gravure coating, etc. As such, this process may be carried out at 15~60° C. for 3 seconds~2 minutes. The black resin film which is formed on the blackening layer may be obtained by applying the resin composition on the surface of the steel plate by means of a coating process used in the art. As such, the coating process is not particularly limited and may include a known process, for example, bar coating, dip coating, roll coating, curtain coating, spray coating, slit coating, gravure coating, reverse coating, etc. The coating temperature is not particularly limited.

MODE FOR INVENTION

The following examples, which are set forth to illustrate but are not to be construed as limiting the present invention, may provide a better understanding of the present invention.

Example 1

Manufacture of Black Resin Steel Plate

A zinc electroplated steel plate having a plating amount of 20 mg/m$^2$ was used, and the steel plate was immersed in a blackening solution (Ni$^{2+}$: 15 wt. %, 15 wt. %, citric acid: 1.5 wt. %, water: 68.5 wt. %) at 40° C. for 10 seconds under conditions of pH 1.2~1.3, so that a blackening layer (Ni: 30 wt. %, Zn: 10 wt. %, O: 60 wt. %) was formed (to a thickness 0.5 μm) on both sides of the steel plate. A resin composition comprising a main resin including a polyester resin and a melamine resin and based on 100 parts by weight of the main resin, 10 parts by weight of carbon black, 30 parts by weight of aromatic hydrocarbon and 2 parts by weight of a PTFE-based wax was subjected to 2-roll reverse coating on the blackening layer on the top of the steel plate, thus forming a black resin film (thickness 5 μm) on one side of the steel plate.

Also, a resin composition comprising 100 parts by weight of an acrylic urethane resin and 1.5 parts by weight of a TEFLON®-based wax was applied on the bottom of the blackened steel plate using 2-roll reverse coating, thus forming a black resin film (thickness 0.5 μm) on the other side of the steel plate.

Comparative Example 1

ZINKOTE™ Black (resin film 5 μm) available from Nippon Steel Corporation was used.

Comparative Example 2

A black resin steel plate (POSCO-BL 05t, resin film 10 μm) available from Posco was used.

Test Example

1. Blackness

Using a colorimeter, subtracting whiteness (L*) from 100 gave blackness.

2. Drawing Ability (OT-Bending)

In order to evaluate drawing ability, a sample was cut to a size of 25 mm×100 mm, and then bent at 180° so that the black resin of the top coat faced outwards, after which the bent surface was observed with macro color photography.

3. Corrosion Resistance

Corrosion Resistance of a black resin steel plate was determined by measuring a period of time required to generate white rust on the surface of the sample in a salt spray chamber based on the American Society of Testing and Materials (ASTM-B117).

4. Glossiness

Glossiness was determined by measuring the quantity of reflected light relative to the quantity of incident light. When the case where light is completely reflected like a mirror was set to 100 and the case where there is no reflection was set to 0, reflected light was measured at the incident angle of 60° on the surface to be measured. In the present test, a gloss meter according to ISO 2813 was used.

5. Coefficient of Friction

A sample was cut to a size of 150 mm×50 mm and then subjected to a draw bead test under conditions of a load of 650 kgf and a rate of 2 mm/s, and thus the coefficient of friction thereof was calculated.

TABLE 1

|  | Ex. 1 | C. Ex. 1 | C. Ex. 2 |
|---|---|---|---|
| Black Resin Film Thickness (μm) | 5 | 5 | 10 |
| Glossiness/Blackness | 20/76 | 22/79 | 8/75 |
| Drawing ability (OT-Bending) | no crack | crack | no crack |
| Corrosion Resistance (hrs) | >160 | 72 | >160 |
| Coefficient of Friction(one side/the other side) | 0.2/0.1 | 0.12/0.13 | 0.29/0.17 |

Examples 2~3 and Comparative Examples 3~4

These examples were carried out in the same manner as in Example 1, with the exception that a blackening solution having the compositions shown in Table 2 below was used.

TABLE 2

| | Blackening Solution Composition (wt %) | | | |
|---|---|---|---|---|
| | Ni$^{2+}$ | Cl$^-$ | Citric acid | Water |
| C. Ex. 3 | 8 | 15 | 1.5 | 75.5 |
| Ex. 2 | 15 | 15 | 1.5 | 68.5 |
| Ex. 3 | 18 | 17 | 1.5 | 63.5 |
| C. Ex. 4 | 20 | 35 | 1.5 | 43.5 |

TABLE 3

| | Atom Ratio of Blackening Layer | | | Black Resin Film Thick. | Glossiness/ | Drawing ability | Corrosion Resistance | Coefficient of Friction (one side/ |
|---|---|---|---|---|---|---|---|---|
| | Ni | Zn | O | (μm) | Blackness | (OT-Bending) | (hrs) | the other side) |
| C. Ex. 3 | 12 | 10 | 78 | 5 | 24/75 | crack | 100 | 0.32/0.32 |
| Ex. 2 | 28 | 10 | 62 | 5 | 22/78 | no crack | 160 | 0.18/0.12 |
| Ex. 3 | 25 | 8 | 67 | 5 | 22/76 | no crack | 150 | 0.17/0.11 |
| C. Ex. 4 | 15 | 15 | 70 | 5 | 18/70 | crack | 80 | 0.32/0.2 |

As is apparent from Tables 1 to 3, in the black resin steel plate according to the present invention, the coefficient of friction of the black resin film was adjusted, and thereby problems, which had been caused by reducing the thickness of the resin film, could be solved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A black resin steel plate, comprising:
a blackening layer formed on one side of a zinc plated steel plate, wherein the blackening layer has an atom composition comprising Ni, Zn, and O at a weight ratio of Ni:Zn:O=25~75:2~25:20~70; and
a black resin film which is formed on the blackening layer and which contains a black pigment and satisfies Formula 1 below:

$$0.05 \leq X \leq 0.27 \quad \text{[Formula 1]}$$

wherein X is a coefficient of friction calculated by a draw bead test of a black resin film sample having a size of 150 mm×50 mm under conditions including a load of 650 kgf and a rate of 20 mm/s.

2. The black resin steel plate of claim 1, wherein the blackening layer comprises a nickel-zinc oxide.

3. The black resin steel plate of claim 1, wherein the blackening layer has a thickness of 0.05~5 μm.

4. The black resin steel plate of claim 1, wherein the black resin film has a thickness of 0.5~25 μm.

5. The black resin steel plate of claim 1, wherein blackness is 70 or more.

6. The black resin steel plate of claim 1, comprising a blackening layer and a black resin film formed on the other side of the zinc plated steel plate, in which compositions of the blackening layer and the black resin film on the other side of the zinc plated steel plate are the same as compositions of the blackening layer and the black resin film on the one side of the zinc plated steel plate.

7. The black resin steel plate of claim 6, wherein the black resin films further comprise a wax.

8. The black resin steel plate of claim 1, comprising a blackening layer and a black resin film formed on the other side of the zinc plated steel plate, in which a composition of the blackening layer on the other side of the zinc plated steel plate is the same as a composition of the blackening layer on the one side of the zinc plated steel plate and a composition of the black resin film on the other side of the zinc plated steel plate is different from a composition of the black resin film on the one side of the zinc plated steel plate.

9. The black resin steel plate of claim 8, wherein the black resin film on the other side has a thickness of 0.1~1 μm.

10. The black resin steel plate of claim 8, wherein the black resin film on the one side satisfies Formula 1 below, and the black resin film on the other side satisfies Formula 2 below:

$$0.05 \leq X \leq 0.27 \quad \text{[Formula 1]}$$

wherein X is a coefficient of friction calculated by a draw bead test of a black resin film sample having a size of 150 mm×50 mm under conditions including a load of 650 kgf and a rate of 20 mm/s; and $$0.05 \leq X \leq 0.2 \quad \text{[Formula 2]}$$

wherein X is a coefficient of friction calculated by a draw bead test of a black resin film sample having a size of 150 mm×50 mm under conditions including a load of 650 kgf and a rate of 20 mm/s.

11. A method of manufacturing a black resin steel plate, comprising:
forming a blackening layer on a steel plate, wherein forming the blackening layer is performed by applying a blackening solution comprising 10~20 wt. % of $Ni^{2+}$, 11~18 wt. % of $Cl^-$, 1~3.5 wt. % of an organic acid, and a remainder of water; and
forming a black resin film that satisfies Formula 1 below, on the blackening layer:

$$0.05 \leq X \leq 0.27 \quad \text{[Formula 1]}$$

wherein X is a coefficient of friction calculated by a draw bead test of a black resin film sample having a size of 150 mm×50 mm under conditions including a load of 650 kgf and a rate of 20 mm/s.

12. The method of claim 11, wherein the organic acid is one or more selected from the group consisting of acetic acid, citric acid, tartaric acid, malic acid, oxalic acid, phthalic acid, and maleic acid.

* * * * *

UNITED STATES PATENT AND TRADEMARK OFFICE
CERTIFICATE OF CORRECTION

PATENT NO. : 8,956,734 B2
APPLICATION NO. : 13/824535
DATED : February 17, 2015
INVENTOR(S) : Yon Kyun Song et al.

It is certified that error appears in the above-identified patent and that said Letters Patent is hereby corrected as shown below:

On the Title Page

Item (54) and in the Specification, Column 1, Line 3, Title, before "MANUFACTURING" insert
-- GLOSSINESS AND METHOD OF --

Column 1, Item (75) Inventors, delete "Gwangyung-si" and insert -- Gwangyang-si --

Signed and Sealed this
Ninth Day of June, 2015

Michelle K. Lee
*Director of the United States Patent and Trademark Office*